US005553064A

United States Patent [19]
Paff et al.

[11] Patent Number: 5,553,064
[45] Date of Patent: Sep. 3, 1996

[54] HIGH SPEED BIDIRECTIONAL DIGITAL CABLE TRANSMISSION SYSTEM

[75] Inventors: Thomas M. Paff, Los Altos; Hatch Graham, Morgan Hill, both of Calif.

[73] Assignee: Stanford Telecommunications, Inc., Sunnyvale, Calif.

[21] Appl. No.: 223,487

[22] Filed: Apr. 5, 1994

[51] Int. Cl.$^6$ ............................................ H04J 4/00
[52] U.S. Cl. .................................... 370/50; 348/10
[58] Field of Search ...................... 370/50, 124, 85.1, 370/85.2, 85.3, 120, 69.1, 123, 85.6; 375/18, 20, 42, 54, 56, 38, 39, 41, 48, 86, 88, 290, 293, 260, 263, 272, 273, 281, 283, 332, 334, 235, 245; 455/5; 348/6, 10, 14, 27, 423, 15, 724, 726; 340/825.5, 825.58, 825.51; 379/93, 94, 95, 96, 97

[56] References Cited

U.S. PATENT DOCUMENTS

| Re. 32,327 | 1/1987 | Biba et al. ...................... 370/124 |
|---|---|---|
| 4,498,169 | 2/1985 | Rozmus ............................ 370/85.1 |
| 5,084,903 | 1/1992 | McNamara et al. .............. 375/18 |
| 5,157,491 | 10/1992 | Kassatly ............................ 348/16 |
| 5,255,267 | 10/1993 | Hansen et al. .................... 370/124 |
| 5,272,700 | 12/1993 | Hansen et al. .................... 370/124 |
| 5,351,234 | 9/1994 | Beierle et al. .................... 370/124 |

OTHER PUBLICATIONS

Stanford Telecom, ASIC Custom Products Division Brochure entitled "Block Phase Estimator STEL–2211", Oct. 19, 1993.
Stanford Telecom, ASIC Custom Products Division Brochure entitled "Dual 64–TAP, 11 Mcps Digital Matched Filter STEL 3340", Jul., 1993.
Stanford Telecom, ASIC Custom Products Division Brochure entitled "32–Bit Resolution CMOs Phase and Frequency Modulated Numerically Controlled Oscillator STEL–1177", Jun., 1993.
Stanford Telecom, ASIC Custom Products Division Brochure entitled "Introduction to Direct Digital Synthesis", Jun., 1991.
Lyford et al., "Telephony over cable: CISN and CLC–500", Communications Technology 54: 46, 70, 72, 73 (Dec. 1993).
Digital Communications, Fundamentals and Applications, Bernard Sklar, 1988, pp. 460–464.

Primary Examiner—Douglas W. Olms
Assistant Examiner—Dang Ton
Attorney, Agent, or Firm—Townsend and Townsend and Crew; Henry K. Woodward

[57] ABSTRACT

A high speed bidirectional cable transmission system for CATV and other television systems includes unidirectional transmission of video signals from a head end unit to a plurality of transceivers or subscribers connected to a transmission line. The head end unit encodes voice data using QPSK encoding and time division multiplexing of the encoded data in a plurality of frequency bands to the subscribers. Each subscriber attached to the cable for receiving continuous transmission of voice and video data is assigned an identification number and at least one voice channel for selectively accessing data. Each subscriber includes a transmitter for transmitting voice data on the cable to the head end unit using time division multiple access transmission of bursts of data in a plurality of frequency bands.

4 Claims, 7 Drawing Sheets

HIGH SPEED BIDIRECTIONAL DIGITAL CABLE TRANSMISSION SYSTEM

BACKGROUND OF THE INVENTION

This invention relates generally to data transmission systems, and more particularly the invention relates to a cable system for high speed bidirectional digital transmission of voice, video, and data.

Much attention is being directed to converting unidirectional analog data transmission systems, such as the community antenna television (CATV) cable system into more versatile bidirectional communication systems. Today, over 60 million households in the United States enjoy the benefits of cable TV, virtually all of the information which travels into the home over the cable is in the form of analog television signals. Some subscribers now have the ability to send digital commands to select movies or provide other forms of low rate data information from the home to a central location. However, in the next few years the rate of digital information both entering and leaving the home over the CATV cable will increase dramatically.

Capabilities now being envisioned to exploit the band width of the cable include all conventional telephony services and a variety of multimedia capabilities including digital video or high speed "video phone", remote video games, high speed data and a wide variety of consumer purchasing and voting services. As the computer is merged with the cable, the consumer will be able to rent movies, play games, take college courses, make travel plans, trade stocks, and the like.

The present invention is directed to providing a bidirectional digital cable transmission system including a head end unit and a plurality of subscribers capable of high speed bidirectional transmission of data over cable, such as in a CATV system.

SUMMARY OF THE INVENTION

In accordance with the present invention, a cable data transmission system utilizes time division multiplexing in a downstream direction from a head end unit to multiple subscribers and a time division multiple access transmission from subscribers to the head end unit. The multiple upstream and downstream data channels are shared using different frequency bands. In the downstream, data are broadcast to all subscribers. However, each subscriber is assigned an identification number and a specific carrier frequency for receiving data. The bitstream is continuous using time division multiplexing (TDM) and frequency division duplexing (FDD).

In the upstream, subscribers send data to the head end in a burst fashion in assigned time slots using time division multiple access (TDMA).

In accordance with a feature of the invention, a quadrature phase shift keyed (QPSK) modulator is provided for data encoding and modulation for upstream and downstream transmission.

In accordance with another feature of the invention, a head end burst demodulator is provided for receiving data at the head end from subscribers.

In accordance with a further feature of the invention, a subscriber demodulator is provided for continuously receiving data at a subscriber from the head end.

The invention and objects and features thereof will be more readily apparent from the following detailed description and appended claims when taken with the drawing.

DETAILED DESCRIPTION OF ILLUSTRATIVE EMBODIMENTS

Figure 1:
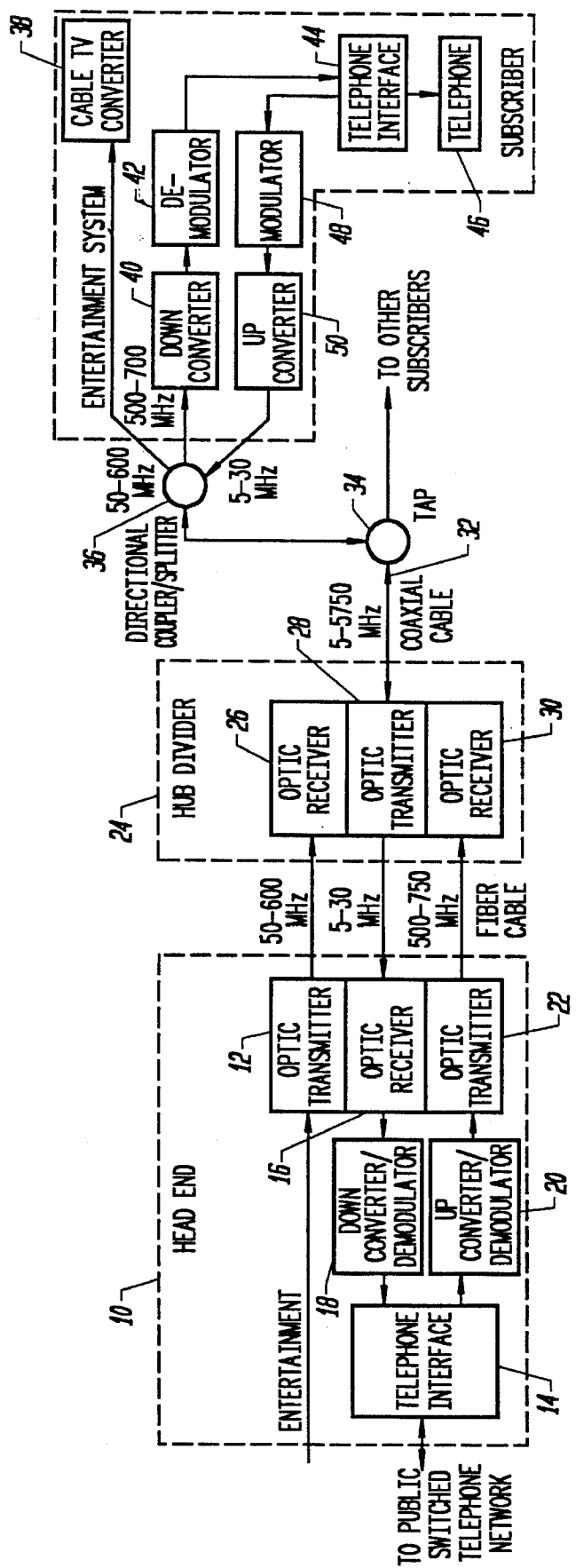
FIG. 1 is a functional block diagram of a high speed bidirectional digital cable transmission system in accordance with the invention.
Figure 4:
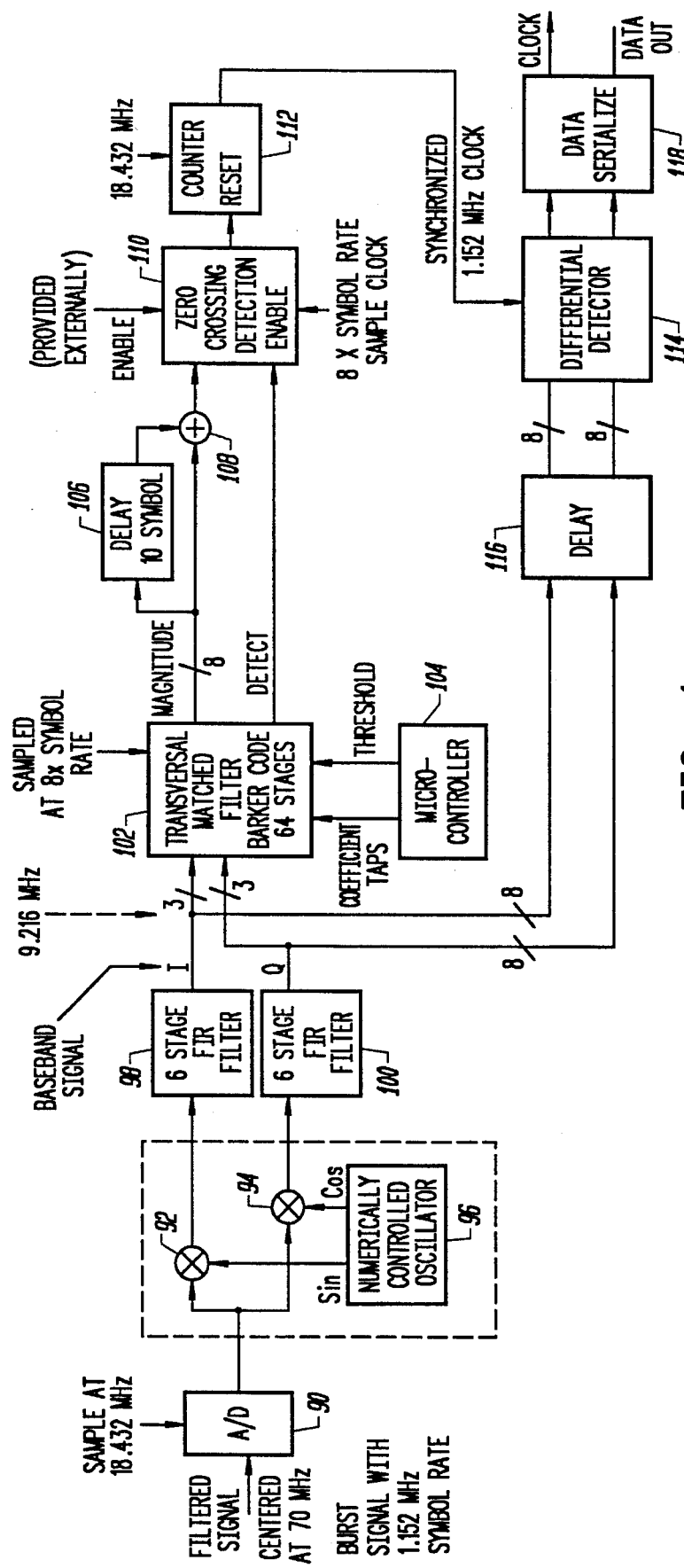
FIG. 4 is a functional block diagram of a head end burst demodulator for the system of FIG. 1.

Referring now to the drawing, FIG. 1 is a functional block diagram of a high speed bidirectional digital cable transmission system in accordance with the invention. The head end unit 10 comprises optical cable transmission lines and includes an optic transmitter 12 for the transmission of entertainment signals (e.g., movies, games, and the like) over a frequency band of 50–600 MHz and a telephone interface 14 for interfacing between a public switched telephone network and telephone or voice signals from subscribers. As will be described further hereinbelow, the incoming voice signals are transmitted in bursts in 6 MHz frequency channels between 5 and 30 MHz. The burst signals are received by an optical receiver 16 which applies the signal to the downconverter/demodulator 18. The downconverter/demodulator 18, described further hereinbelow with reference to FIG. 4, provides digital voice signals to the telephone interface 14. An upconverter/modulator 20, described further hereinbelow with reference to FIG. 2, converts analog voice signals from the telephone interface 14 to digital data which are then coded and upconverted in frequency for transmission to optic transmitter 22 which transmits the encoded data using time division multiplexing in the frequency bands between 500 and 750 MHz. A hub divider 24 includes an optic receiver 26, an optic transmitter 28, and an optic receiver 30 for interfacing between the optical cable of the head end unit and the coaxial cable 32 of the transmission system.

Data is continuously transmitted through the coaxial cable 32 to subscribers in multiple channels with the data being broadcast to all subscribers. Each subscriber is connected to the coaxial line by means of a tap 34 which is connected through a directional coupler/splitter 36 for providing entertainment system signals in the 50–600 MHz band to a cable TV converter 38. Voice signals in the 500–700 MHz range are downconverted at 40 and demodulated at 42 and applied through telephone interface 44 to a telephone 46. Voice signals from the telephone 46 are applied to the telephone interface 44, modulator 48, and upconverter 50 through the directional coupler and tap 34 as a burst of data using time division multiple access in an upstream channel to the head end 10.

Figure 2:
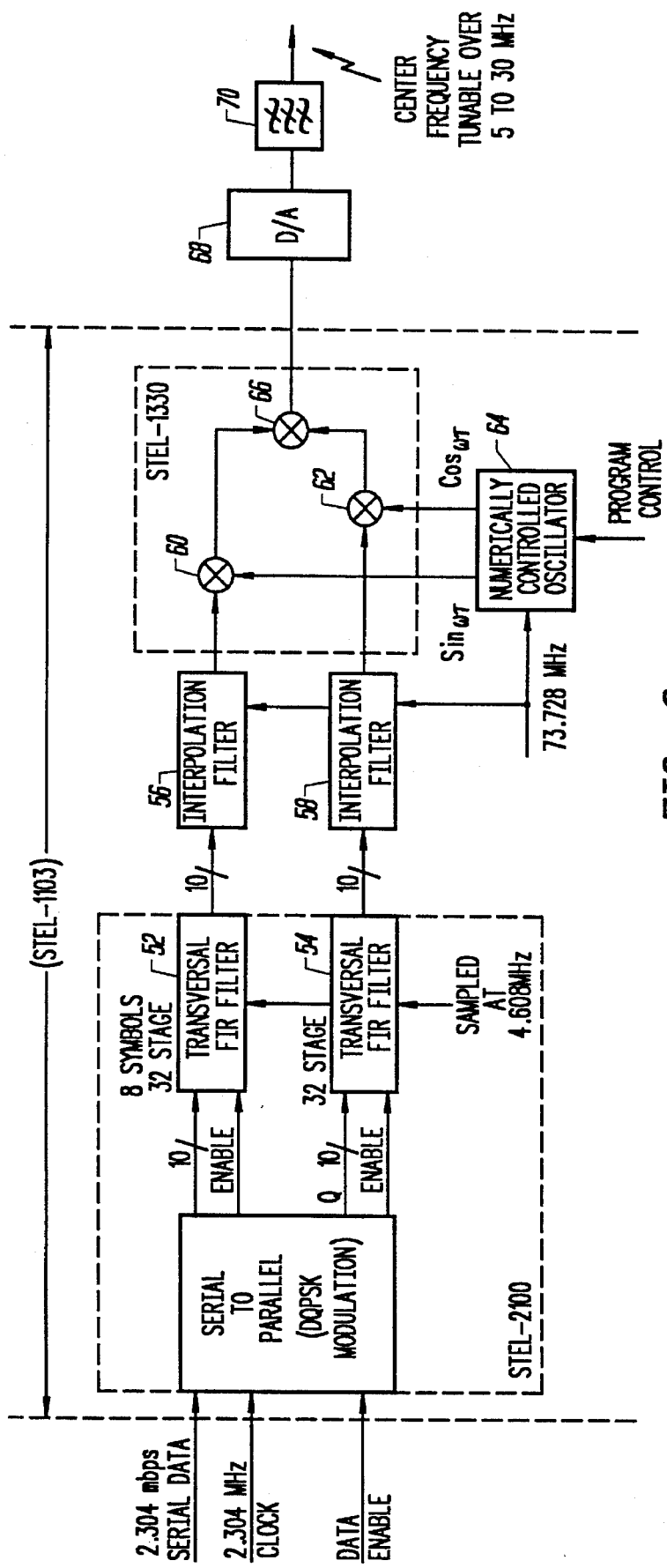
FIG. 2 is a DQPSK modulator and upconverter for the system of FIG. 1.

FIG. 2 is a functional block diagram of the upconverter/modulator and the head end 10 and of the modulator 48 and upconverter 50 in the subscriber. Serial data is received by a serial to parallel converter and DQPSK modulator 50 along with a 2,304 MHz clock and a data enable signal. The data enable signal is a "1" or continuous for the continuous transmission at the head end unit, and the data enable is a toggled signal at the subscriber for the generation of data bursts.

In-phase and quadrature phase modulated signals from the phase shift keyed modulator are applied to transverse finite impulse response (FIR) filters 52, 54, along with enable signals. Each filter has 32 stages which are sampled at 4,608 MHz. Units 50, 52, 54 are available as the Stanford Telecom part no. STEL2102.

The sampled data from the FIR filters 52, 54 are then applied through interpolation filters 56, 58 to provide additional data for mixers 60, 62. The sampled and interpolated data are mixed with sine and cosine signals from numerically controlled oscillator 64 which are then summed at 66 and applied through a digital to analog converter 68 which provides a modulation signal to a tunable oscillator 70 for transmitting the analog signal in 6 Mhz frequency bands from 5 to 30 MHz. A subsequent frequency upconverter is required for stepping up the frequencies to 500–750 MHz for the head end converter and modulator. The numerically controlled oscillator 64 can be the STEL1177 of Stanford Telecom, and the mixer 60, 62 can be the STEL1330 devices which are commercially available.

Figure 3:
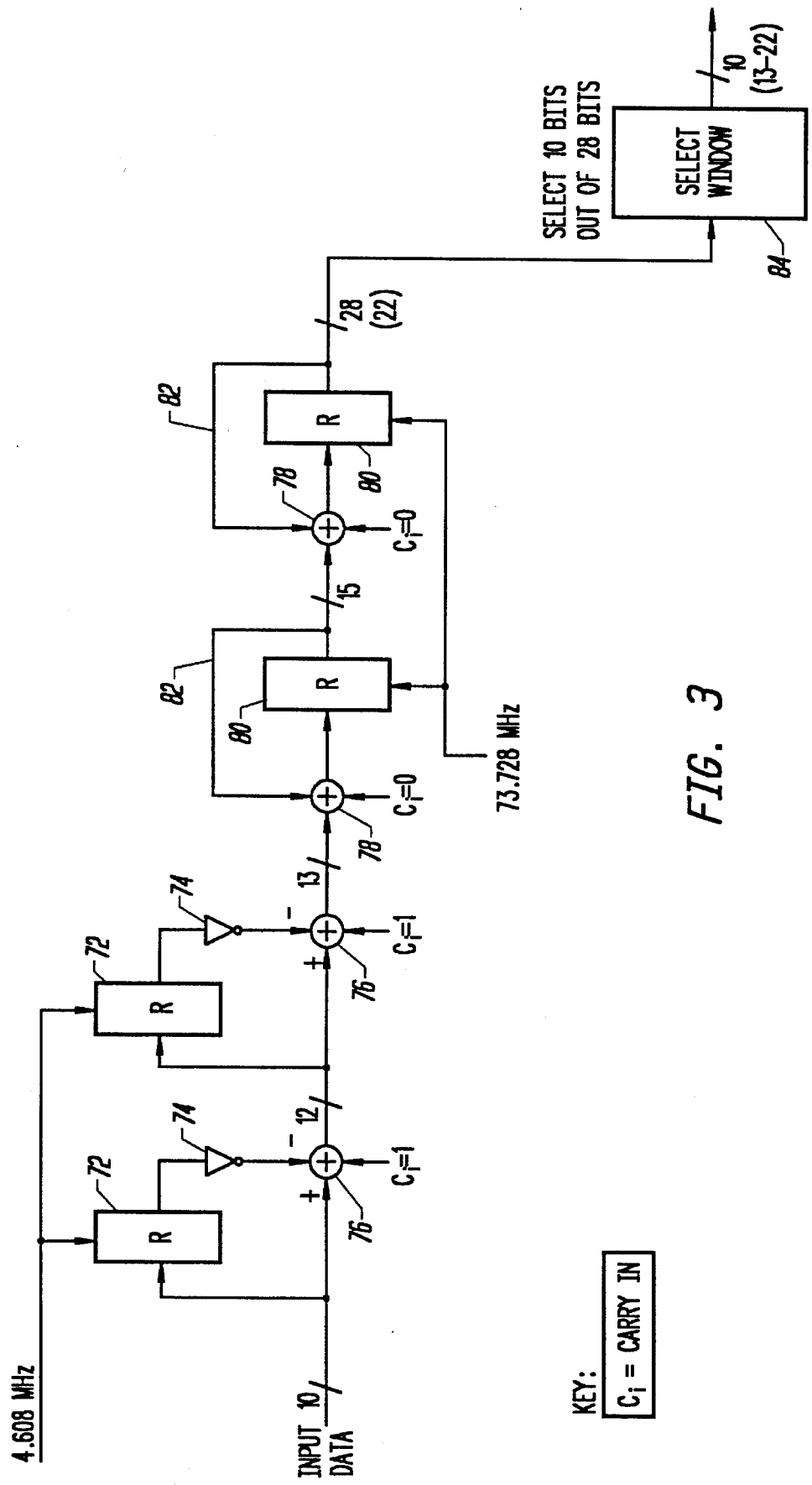
FIG. 3 is a schematic of an interpolation filter in the modulator of FIG. 2.

FIG. 3 is a schematic diagram of one of the interpolation filters 56, 58. The digital input data (in-phase or quadrature phase) is sequentially applied to a feed forward section including three stages each having a delay register 72 and inverter 74 for feed forwarding and summing the delayed data with incoming data at summer 76. The 13 bit data from the feed forward section is then applied through a feedback integration section comprising three stages, each having a summer 78, a delayer register 80, and a feedback loop from the output of the register 80 to the summer 78. For a 10-bit input data, a 28-bit output datum is obtained which is then applied through a selection window 84 in which 10 sequential bits out of the 28 bits can be selected for an output.

FIG. 4 is a functional block diagram of the head end burst demodulator for recovering the digital voice data from the transmitted bursts of data from subscribers. The input filtered signal is up-converted in frequency centered at 70 MHz for processing and are applied through an analog to digital converter 90 which is sampled at 18.432 MHz. The digital data is then applied to mixers 92, 94 driven by numerically controlled oscillator 96 with the in-phase and quadrature phase outputs from the mixers applied through 6-stage FIR filters 98, 100 to provide baseband in-phase (I) and quadrature phase (Q) signals. The mixers 92, 94 and oscillator 96 can be the commercially available STEL2130.

The baseband signals are then applied through a transversal matched Barker code filter 102 which is provided coefficients for the 64 stages of the filter and a threshold control from microcontroller 104. The commercially available STEL3340 is a suitable, commercially available matched filter.

Figure 5:
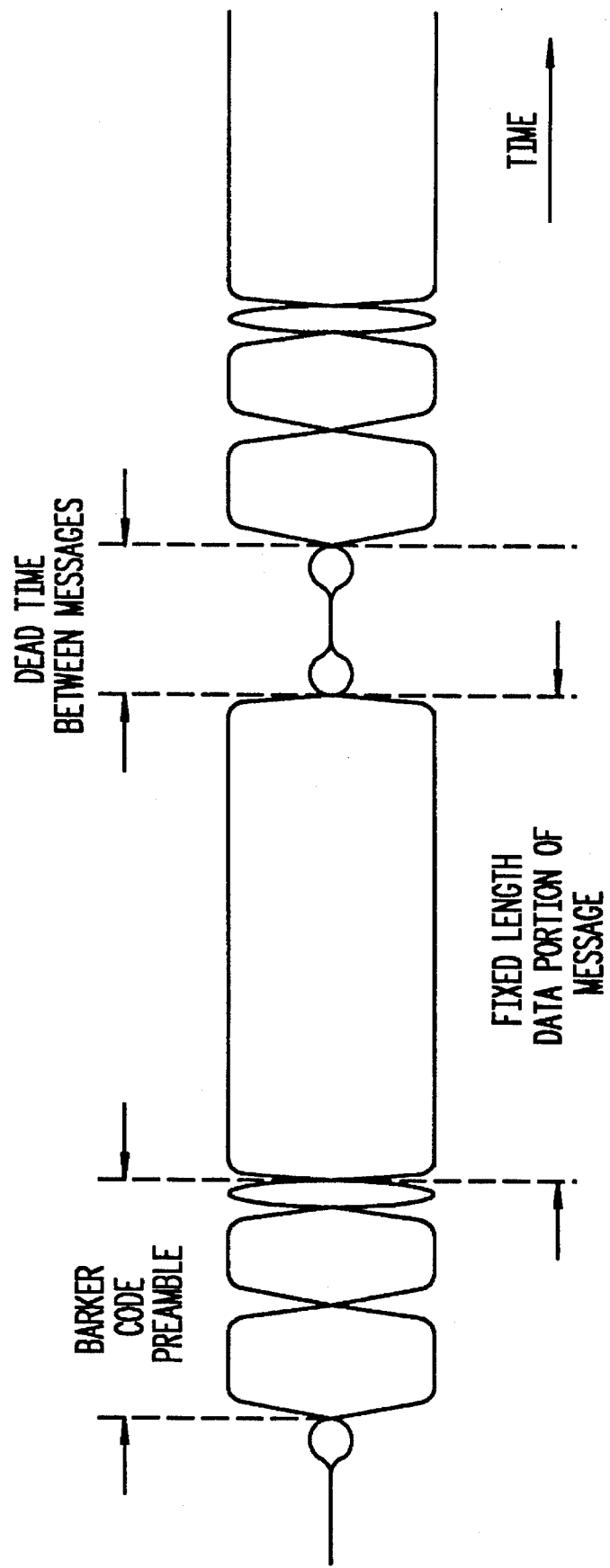
FIG. 5 is a diagram of a TDMA data burst as transmitted to the head end of the system of FIG. 1.

Each of the in-phase and quadrature phase baseband signals applied as an input to the matched filter 102 is a burst signal having the structure shown in FIG. 5. A Barker code preamble precedes a fixed length data portion of a message, and dead time is provided between transmitted messages as shown. The matched filter recognizes the Barker code and extracts the data portion of the message. Output data bits are delayed at 106 and summed at 108 and then applied to a zero crossing detector 110. The output of the zero crossing detector is applied to the reset of a counter 112 driven by an 18.432 MHz clock to provide a 1,152 MHz synchronized clock output to a differential detector 114. The in-phase and quadrature phase baseband signals from FIR filters 98, 100 are applied through a delay 118 to the differential detector 114 with the detected data from detector 114 applied through serializer 116 as the digital voice data output.

Figure 6:
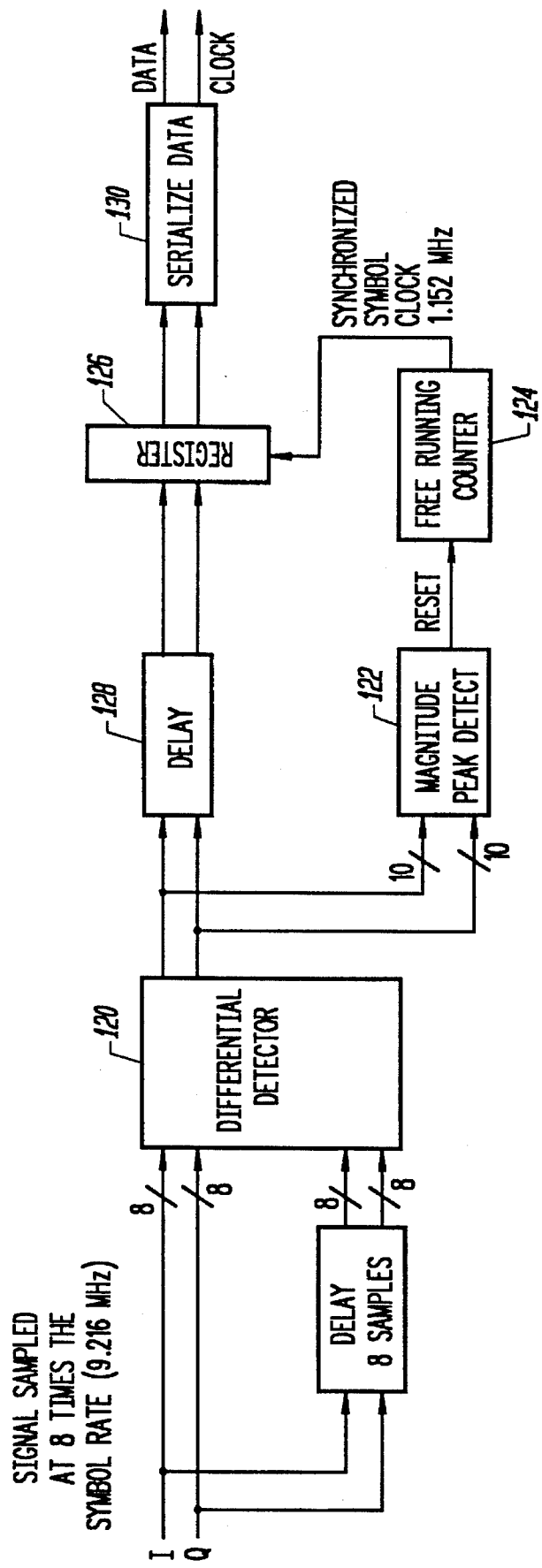
FIG. 6 is a functional block diagram of an alternative Barker code detector for use in the demodulator of FIG. 4.

FIG. 6 is a functional block diagram of an alternative Barker decoder which is less complex but requires a higher signal-to-noise ratio. The received I,Q baseband signals from the FIR filters are applied to differential detector 120 and delayed 8 samples and also applied to the differential detector 120 (STEL 2120). The output of the differential detector 120 is applied through a magnitude peak detector 122 to provide a reset signal to a free-running counter 124 which provides a synchronized symbol clock at 1.152 MHz to a register 126. The output of the differential detector 120 is also delayed at 128 and then applied to the register 126. The synchronized output of register 126 is then applied through serializer 130 for providing serial data output and clock signal.

Figure 7:
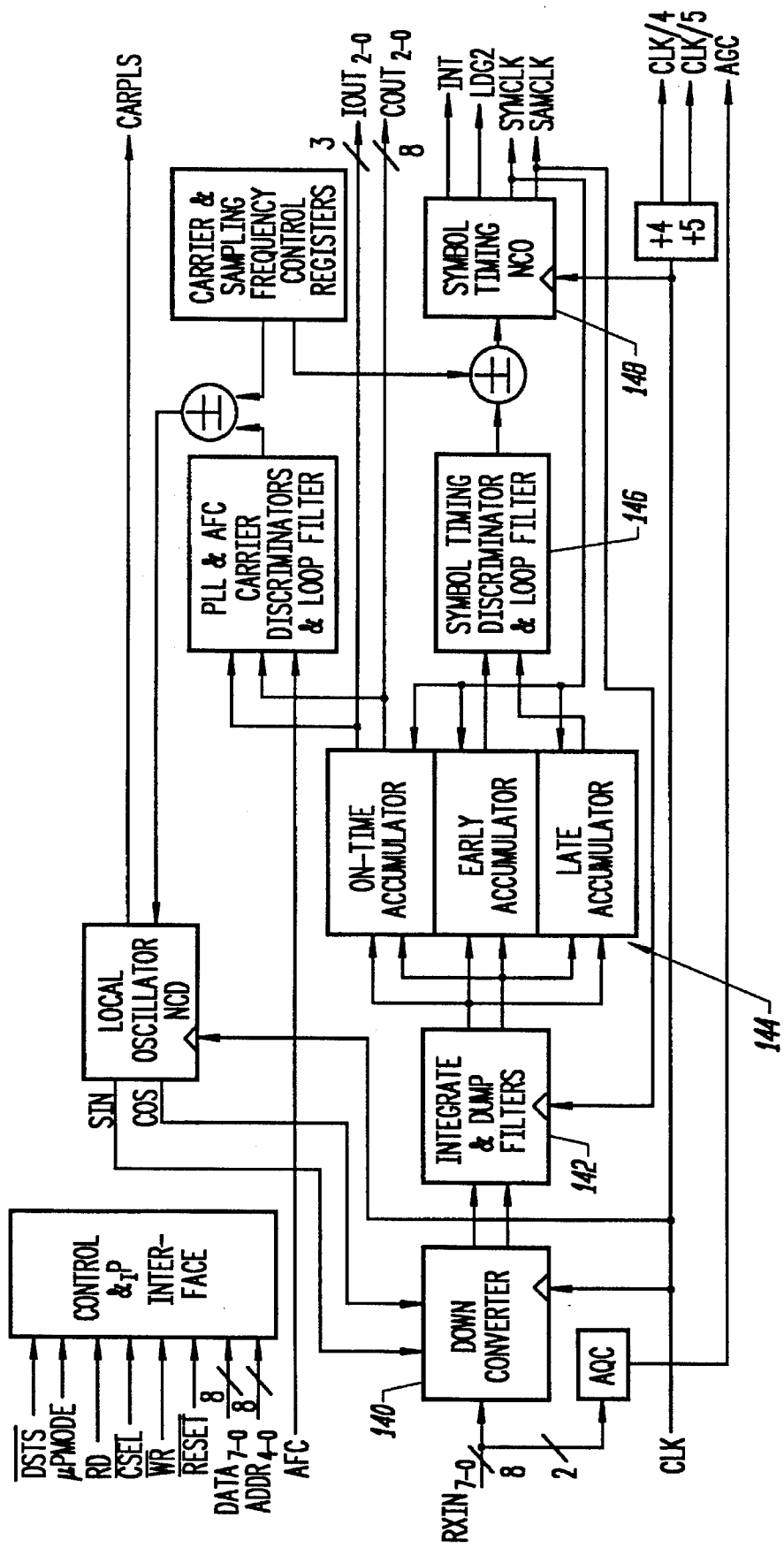
FIG. 7 is a functional block diagram of a subscriber demodulator for use in the system of FIG. 1.

The downstream communication is straightforward with the data being broadcast continuously to all subscribers. FIG. 7 is a functional block diagram of a demodulator for the continuous data received by a subscriber. The STEL 2100 is a commercial demodulator suitable for this purpose. The continuously transmitted signal in the assigned frequency band for a subscriber is applied to a downconverter 140 which allows the received signal to be sampled and digitized directly at IF and converted to baseband digitally. The baseband output signals are then applied to integrate and dump filters 142 which integrate the downconverted sampled to decimate the sampling rate to samples per symbol. Since the accumulation process increases the magnitudes of the signal values, a selectable viewpoint is provided at the outputs of the integrate and dump filters to allow the optimum output bits to be selected for the 8-bit inputs to the symbol integrator block 144 which includes an on time accumulator, an early accumulator and a late accumulator. The most significant bits of the output of the I and Q channel On-Time integrators are the output data.

The symbol timing discriminator and loop filter block 146 generate the symbol timing discriminator function from the difference between the sums of the absolute I and Q values of the early and late integrations from the symbol integrator block. The symbol timing NCO block 148 incorporates a numerically oscillator to synthesize a sampling clock which is used as a dump function of the integrate and dump filters in the downconverter block.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A high speed bidirectional cable television transmission system for providing voice interface between a public switched telephone network and system subscribers comprising a television transmission cable, a head end unit for continuous transmission of voice and video data on said cable to a plurality of cable television subscriber receivers attached to said cable, said continuous transmission including time division multiplexing of data in a plurality of frequency bands, said head end unit including a telephone interface for transmitting and receiving voice data, a quadrature phase shift keyed (QPSK) modulator for receiving and modulating digitized voice data form a public switched telephone network, a mixer for increasing frequency of said QPSK modulated data, a digital to analog conversion means for converting said QPSK modulated data to analog form for transmission on said cable, a burst demodulator including sine and cosine mixers to extract in-phase and quadrature phase encoded data, a transversal matched filter to identify a Barker code at the beginning of a burst of data, and a differential detector operating in synchronization with a detected Barker code for detecting in-phase and quadrature phase encoded data, a plurality of transceivers, each attached to said cable for receiving said continuous transmission of voice and video data, each of said transceivers being assigned an identification number and at least one voice channel for selectively accessing data, each transceiver including transmitting means for transmitting voice data through said cable and said head end unit to the public switched telephone network using time division multiple access transmission of bursts of data in said plurality of frequency bands, a quadrature phase shift keyed (QPSK) modulator for receiving and modulating digitized voice data from a telephone, a mixer for increasing frequency of said QPSK modulated data, and a digital to analog conversion means for converting said QPSK modulated to analog form for transmission on said cable to said head end unit.

2. The high speed bidirectional cable transmission system as defined by claim 1 wherein said head end unit transmits QPSK voice data in frequency bands between 500 MHz and 750 MHz and each of said subscribers transmits QPSK voice data in data bursts in frequency bands between 5 MHz and 30 MHz.

3. The high speed bidirectional cable transmission system as defined by claim 1 wherein each QPSK modulator includes in-phase and quadrature phase transversal finite impulse response (FIR) filters and interpolation filters for forming in-phase and quadrature phase data symbols, said mixer including in-phase and quadrature phase mixing elements.

4. The high speed bidirectional cable transmission system as defined by claim 1 wherein each subscriber further includes a downconverter for a received signal and demodulator for providing audio signals to a telephone interface.

* * * * *